(12) United States Patent
Dinh

(10) Patent No.: US 7,521,631 B2
(45) Date of Patent: Apr. 21, 2009

(54) FAR-SIDE SUPPORT FOR BRACKETS

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 77 days.

(21) Appl. No.: 11/732,149

(22) Filed: Apr. 3, 2007

(65) Prior Publication Data
US 2007/0181330 A1 Aug. 9, 2007

Related U.S. Application Data

(63) Continuation-in-part of application No. 11/513,986, filed on Aug. 31, 2006, now Pat. No. 7,271,336, which is a continuation-in-part of application No. 10/944,529, filed on Sep. 17, 2004, now Pat. No. 7,271,335.

(60) Provisional application No. 60/507,024, filed on Sep. 29, 2003, provisional application No. 60/561,641, filed on Apr. 13, 2004.

(51) Int. Cl.
*H01H 9/02* (2006.01)

(52) U.S. Cl. .......................... 174/58; 174/480; 174/481; 174/503; 220/3.2; 220/3.3; 248/906

(58) Field of Classification Search .................. 174/480, 174/481, 50, 53, 57, 58, 61, 496, 503, 54, 174/63; 220/3.2–3.9, 4.02; 248/27.1, 300, 248/56, 57, 68.1, 343, 205.7, 82, 201, 906; 439/535; 312/245

See application file for complete search history.

(56) References Cited

U.S. PATENT DOCUMENTS

| | | |
|---|---|---|
| 1,056,759 A | 3/1913 | Mallery |
| 1,288,024 A | 12/1918 | Kendig |
| 1,756,361 A | 4/1930 | Johnson |
| 1,774,934 A | 9/1930 | Mangin |
| 1,790,031 A | 1/1931 | Vaughn |
| 1,982,957 A | 12/1934 | Knell |
| 2,269,211 A | 1/1942 | Kuykendall |
| 2,314,408 A | 3/1943 | Knight |
| 2,486,764 A | 11/1949 | Singer |

(Continued)

*Primary Examiner*—Angel R Estrada
(74) *Attorney, Agent, or Firm*—Hoffmann & Baron, LLP

(57) ABSTRACT

A mounting bracket assembly for mounting an electrical box having one or more far-side supports, which fold out and contact the structure behind the bracket to provide additional stability and support. The mounting bracket assembly includes: a mounting plate having a pair of opposing sides, an opening for receiving an electrical box and a far-side support; and a mounting bracket attaching end. The far-side support has a first end, a second end and a pair of sides and includes a first section and a second section. The far-side support foldably extends from the mounting plate and the second section foldably extends from the first section. The first end of the far-side support is connected to the mounting plate and the far-side support can include a support bending aperture at the first end. The second section can include a first end, a second end and a pair of sides and the first end of the second section can have an extender bending aperture and can connect to the second end of the first section. The pair of sides of the first section are substantially parallel to the pair of sides of the second section.

16 Claims, 10 Drawing Sheets

U.S. PATENT DOCUMENTS

| | | |
|---|---|---|
| 2,881,924 A | 4/1959 | Kruse et al. |
| 2,990,172 A | 6/1961 | Gianotta |
| 3,038,020 A | 6/1962 | Winter et al. |
| 3,039,729 A | 6/1962 | Nagle, Sr. |
| 3,182,805 A | 5/1965 | Foster, Jr. et al. |
| 4,790,505 A | 12/1988 | Rose et al. |
| 4,832,297 A | 5/1989 | Carpenter |
| 4,964,525 A | 10/1990 | Coffey et al. |
| 5,009,383 A | 4/1991 | Chapman |
| 5,098,046 A | 3/1992 | Webb |
| 5,114,105 A | 5/1992 | Young |
| 5,224,673 A | 7/1993 | Webb |
| D342,938 S | 1/1994 | Cheatham |
| 5,288,041 A | 2/1994 | Webb |
| 5,330,137 A | 7/1994 | Oliva |
| 5,405,111 A | 4/1995 | Medlin, Jr. |
| 5,423,499 A | 6/1995 | Webb |
| 5,516,068 A | 5/1996 | Rice |
| 5,927,667 A | 7/1999 | Swanson |
| 5,931,425 A | 8/1999 | Oliva |
| 6,098,939 A | 8/2000 | He |
| 6,188,022 B1 | 2/2001 | He |
| 6,209,836 B1 | 4/2001 | Swanson |
| 6,384,334 B1 | 5/2002 | Webb |
| 6,545,214 B2 | 4/2003 | Russell et al. |
| 6,573,449 B2 | 6/2003 | Vrame |
| 6,590,155 B2 | 7/2003 | Vrame et al. |
| 6,723,918 B2 | 4/2004 | Vrame |
| 6,765,146 B1 | 7/2004 | Gerardo |
| 6,803,521 B2 * | 10/2004 | Vrame ..................... 174/58 |
| 6,871,827 B2 * | 3/2005 | Petak et al. ............... 174/58 |
| 6,996,943 B2 | 2/2006 | Denier et al. |
| 7,053,300 B2 | 5/2006 | Denier et al. |
| 7,208,679 B2 * | 4/2007 | Phillips ..................... 174/58 |
| 7,271,335 B2 * | 9/2007 | Dinh ........................ 174/58 |

\* cited by examiner

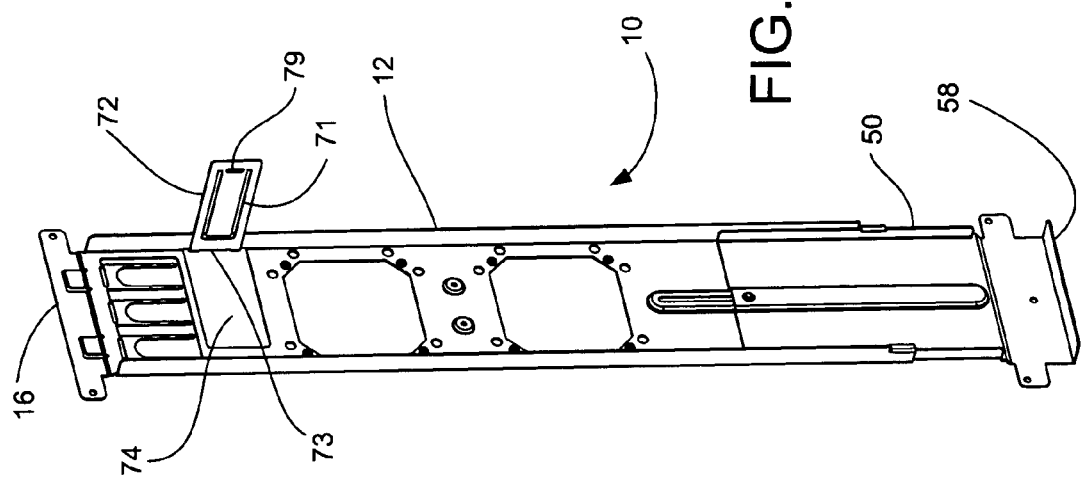
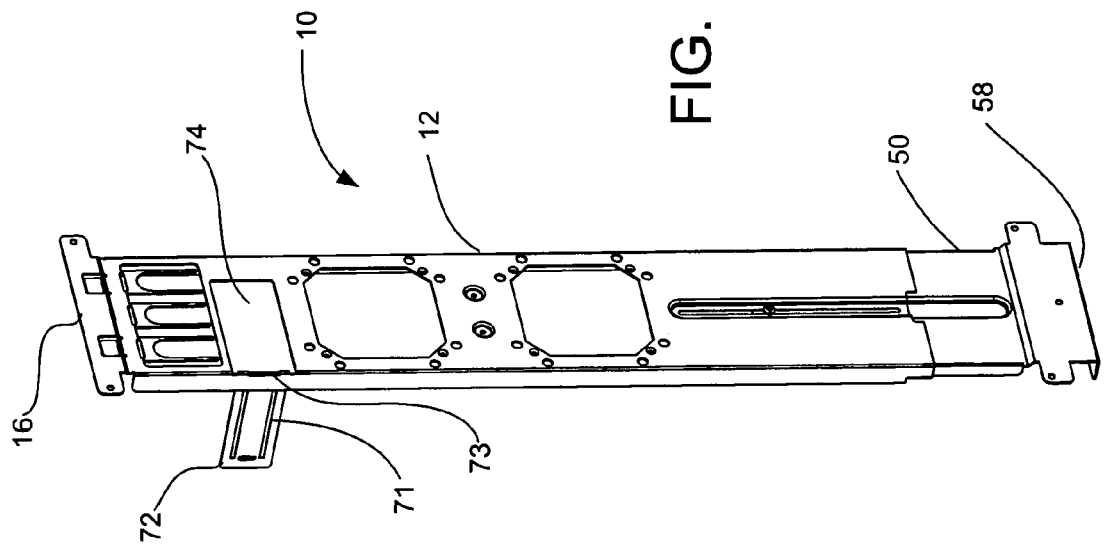

FAR-SIDE SUPPORT FOR BRACKETS

This application is a continuation-in-part application of application Ser. No. 11/513,986, filed on Aug. 31, 2006, now U.S. Pat. No. 7,271,336 which is now a continuation-in-part application of application Ser. No. 10/944,529, filed on Sep. 17, 2004, now U.S. Pat. No. 7,271,335 which claims priority from U.S. Provisional Application No. 60/507,024, filed on Sep. 29, 2003, and U.S. Provisional Application No. 60/561,641, filed on Apr. 13, 2004, all of which are incorporated herein in their entirety.

FIELD OF THE INVENTION

This invention pertains to a mounting bracket assembly for mounting electrical boxes within walls, floors or ceilings and, more particularly, to a far-side support for an mounting bracket assembly employing a mounting bracket to which one or more electrical boxes are secured.

BACKGROUND OF INVENTION

There are many different methods used to secure electrical boxes to the walls, floor or ceilings of a structure, such as a building. When studs are used to frame the structure, the most common method used is to secure the box directly to the stud. The advantage of this method is that installation is quick and simple. However, there is no guarantee that all the boxes installed in this fashion will be the same height off the floor and that they will be adequately supported. Also, there is no guarantee that all the boxes will be positioned at the same depth within the wall cavity. This is important so that any dry-wall ring or other device subsequently secured to the box will fit properly on the surface of the wall material.

When an extendable mounting bracket for an electrical box is required to span two adjoining studs that are not closely spaced together, it is often necessary to provide additional support for the bracket. This is especially true when more than one electrical box is mounted on the bracket and the weight of the boxes causes the bracket to flex and/or bend. Moreover, if the architectural plans call for the box or boxes to be mounted some distance from a stud, then methods requiring direct stud-mounting cannot be employed. In such cases, a bracket is required in order to support the box at some distance from the stud. There are basically two different types of brackets used for this type of application, either horizontal wall-mounted brackets or vertical floor-mounted brackets. In either case, once a particular electrical box size is selected and secured to the bracket, the installer is limited to using only a correspondingly sized dry-wall ring or other cover attachment.

Many different designs of floor-mounted and wall-mounted brackets are known and they typically are designed for mounting vertically with one end attached to the sole plate of a wall or between studs with standard center-to-center dimensions. Therefore, a user may have to stock several different sizes of brackets to accommodate different center-to-center dimensions. This is an added expense for the user. Moreover, when a bracket is mounted between studs having non-standard center-to-center dimensions, the user may have to add additional framing before he can install the bracket. Adjustable brackets that have been used in the past do not have the strength and rigidity of non-adjustable brackets and, therefore, have not been widely used. Moreover, brackets that span long distances may flex and bend easily and so they require additional far-side support.

Accordingly, it is an object of the present invention to provide a bracket (which can be either floor-, wall- or ceiling-mounted) for mounting electrical boxes between structural supports within the walls, floor or ceilings of a building that overcomes this deficiency. One object of this invention is to provide an adjustable mounting bracket assembly that is simple in construction and easy to install between studs having a variety of different center-to-center dimensions. Another object of this invention is to provide an adjustable mounting bracket assembly that has adequate strength and rigidity for supporting one or more electrical boxes and a far-side support between the ends of the bracket that are attached to the structure.

SUMMARY OF THE INVENTION

In accordance with the present invention, an adjustable mounting bracket assembly for mounting an electrical box is provided. The adjustable mounting bracket assembly includes: (a) a mounting bracket that includes a substantially flat mounting plate having a first pair of opposing sides, a first opening for receiving an electrical box and a rail having a first aperture; a mounting bracket attaching end; a mounting bracket mating end; and a first pair of opposing sides having a first pair of side walls, wherein the first pair of side walls extend downwardly from the opposing sides of the mounting plate to a pair of edges; (b) an adapter plate that includes: a substantially flat base plate having a pair of opposing sides and a track having a second aperture; an adapter plate attaching end; an adapter plate mating end; and a second pair of side walls extending downwardly from the opposing sides of the base plate; and (c) a fastener. The mounting bracket mating end slidably mates with the adapter plate mating end so that the first aperture in the rail aligns with the second aperture in the track. The fastener is inserted in the first and second apertures and tightened to secure the mounting bracket to the adapter plate.

The rail preferably extends substantially between the first mating end and the first opening in the mounting plate for receiving an electrical box and the track preferably extends substantially between the second mating end and the adapter plate attaching end of the adapter plate. Although shorter rails and tracks are within the scope of the present invention, it has been found advantageous to maximize the lengths of the rail and track in order to provide maximum adjustability of the distances between the opposing ends of the adjustable mounting bracket assembly. In preferred embodiments, the rail is formed by a first depression in the mounting plate and the track is formed by a second depression in the adapter plate. When the mounting bracket slidably receives the adapter plate, the first depression corresponds to the second depression so that the track slidably receives the rail and the first aperture in the rail aligns with the second aperture in the track.

The first aperture in the rail can be a round hole or a slot and the second aperture in the track can also be a round hole or a slot. Preferably, the first aperture in the rail is a slot and the second aperture in the track is a round hole, or the first aperture in the rail is a round hole and the second aperture in the track is a slot. The fastener can include only a screw when the second aperture is a round hole with internal threads for receiving the screw. In preferred embodiments, the fastener includes a screw or a bolt and a nut. In some embodiments, the nut is attached to the base plate and aligned with the second aperture in the base plate.

The mounting plate can include an opening for a second electrical box and a plurality of mounting hole apertures for securing the electrical box to the mounting plate. Typically, the openings for the electrical boxes are located in the central portions of the mounting plate and are spaced a sufficient distance apart so that the structural strength of the mounting plate is maintained. The structural strength of the mounting plate is augmented by the side walls which stiffen the mounting plate and resist twisting under the weight of the electrical boxes.

The mounting bracket attaching end can include one or more bracket mounting apertures for attaching the mounting bracket to a first structure and the adapter plate attaching end can include one or more adapter plate mounting apertures for attaching the adapter plate to a second structure. In preferred embodiments, the second attaching end on the adapter plate has an adapter plate end wall extending downwardly from the adapter plate. This end wall is particularly useful when the adjustable mounting bracket assembly is used in a vertical configuration and the end wall is inserted under the sole plate of a framed wall. Once the adapter plate is attached to a sole plate the mounting bracket can be adjusted so that the opening for the electrical box (or boxes) is at the desired elevation. The attaching end of the mounting bracket, which extends beyond the side walls of the mounting bracket, is then attached to a stud or a horizontal member.

In another embodiment, the mounting plate has a first top surface and a first bottom surface and the rail extends downwardly from the first bottom surface and forms a first depression in the first top surface. Correspondingly, the adapter plate has a second top surface and a second bottom surface and the track extends downwardly from the second bottom surface and forms a second depression in the second top surface. The rail and track are dimensioned so that the rail is slidably received by the track when the mounting bracket slidably receives the adapter plate.

The mounting bracket can also include a pair of tabs which extend inwardly from the edges of the side walls. The tabs in cooperation with the side walls and the mounting plate form a pair of C-shaped openings for receiving the side walls of the adapter plate. In some embodiments, more than one pair of tabs is provided for slidably receiving the side walls of the adapter plate. In other embodiments, the tabs extend substantially from the mating end of the mounting plate to the first electrical box opening. For embodiments wherein the mounting bracket is slidably inserted into the adapter plate, the side walls of the adapter plate extend to form a pair of edges and a pair of tabs extend inwardly from the edges. The tabs in cooperation with the adapter plate side walls and the base plate form a pair of C-shaped openings for receiving the side walls of the mounting bracket.

In another preferred embodiment, the substantially flat base plate is in a first plane and the adapter plate attaching end has a substantially flat surface in a second plane. The first plane and the second plane are parallel and the base plate is connected to the adapter plate attaching end by a connecting wall, which offsets the base plate from the adapter plate attaching end. This offset between the base plate and adapter plate attaching end results in the adapter plate attaching end and the mounting bracket attaching end being in the same, or nearly the same, plane.

Another embodiment of the invention is a mounting bracket assembly for mounting an electrical box that includes one or more far-side supports, which fold out and contact the structure behind the bracket to provide additional stability and support. The mounting bracket assembly includes a substantially flat mounting plate having a pair of opposing sides, an opening for receiving an electrical box and a far-side support; and a mounting bracket attaching end. The far-side support has a first end, a second end and a pair of sides and includes a first section and a second section. The far-side support foldably extends from the mounting plate and the second section foldably extends from the first section. The first end of the far-side support is connected to the mounting plate and the far-side support can include a support bending aperture at the first end. A first support aperture is formed in the mounting plate when the first section is unfolded (i.e., bent away) from the mounting plate. The second section can include a first end, a second end and a pair of sides and the first end of the second section can have an extender bending aperture and can connect to the second end of the first section. A second support aperture is formed in the first section the second section is unfolded (i.e., bent away) from the first section. Preferably, the pair of sides of the first section are substantially parallel to the pair of sides of the second section.

In another embodiment, the far-side support includes a support extender and has a first end, a second end and a pair of sides. The first end, which can include a support bending aperture, is permanently connected to the mounting plate and the second end foldably extends from the mounting plate. The far-side support is substantially flat and substantially rectangular and is pivotably bent at its first end to form a first support aperture in the mounting plate. The support extender can have a first end, a second end and a pair of sides. The first end, which can include an extender bending aperture, is permanently connected to the far-side support and the second end foldably extends from the far-side support. Preferably, the support extender is substantially flat and substantially rectangular and is pivotably bent at its first end to form a second support aperture in the far-side support.

The far-side support can include a first section and a second section, which is part of the first section. The first section of the far-side support is bendably connected to the mounting plate and the second section is bendably connected to the first section. The first section of the far-side support has a first end, which is connected to the mounting plate and which can include a support bending aperture. The second section of the far-side support has a first end, which is connected to the second end of the first section and which can include a support bending aperture. The first section is bent away from the mounting plate to form a first support aperture in the mounting plate and the second section is bent away from the first section to form a second support aperture in the first section.

BRIEF DESCRIPTION OF THE FIGURES

The preferred embodiments of the adjustable mounting bracket assembly for mounting electrical boxes of the present invention, as well as other objects, features and advantages of this invention, will be apparent from the following detailed description, which is to be read in conjunction with the accompanying drawings wherein:

FIGS. 9A and 9B are perspective front and back views of an embodiment of the adjustable mounting bracket assembly with the first section of the far-side support extended.

DETAILED DESCRIPTION OF THE INVENTION

Figure 1:
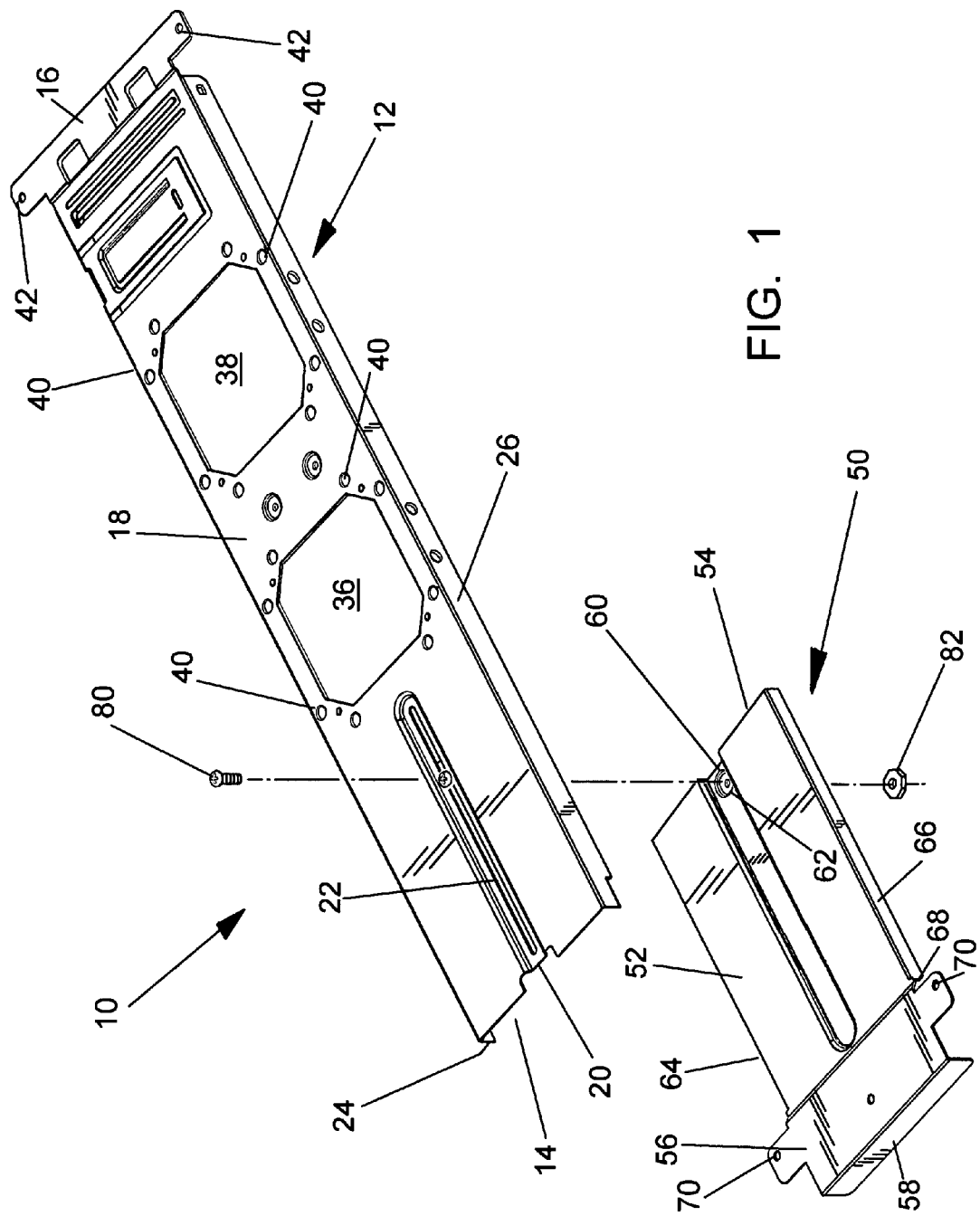
FIG. 1 is a perspective, exploded view of the adjustable mounting bracket assembly, including the mounting bracket and the adapter plate.

The present invention is directed to an adjustable mounting bracket assembly for mounting electrical boxes to a structure. In many cases when an electrical box is mounted in a wall, floor or ceiling, the location selected for the electrical box is not adjacent to a structure that can support the electrical boxes. In these cases, the electrical box is installed in a mounting bracket which is then attached to one or more structural supports. The adjustable bracket assembly of the present invention can be adjusted to vary the distance between the opposing ends so that a single bracket assembly can be used for multiple applications. The adjustable bracket assembly includes a mounting bracket and an adapter plate that are slidably joined to allow the distance between the opposing ends to be adjusted to correspond to different structures.

The adjustable bracket assembly is intended to be attached to wood or metal wall studs in either a horizontal or vertical configuration. When the adjustable mounting bracket assembly is mounted in a horizontal configuration, it is usually attached between two adjacent studs. When the adjustable mounting bracket assembly is mounted in a vertical configuration, the adapter plate attaching end is preferably attached to the toe plate at floor level and the mounting bracket attaching end is attached to a stud or a horizontal member connected between two adjoining wall studs. However, the adjustable mounting bracket assembly is not limited to these applications and it can be attached to almost any wall, floor or ceiling structure. Typically, when the adjustable mounting bracket assembly is attached to a wood frame structure, nails or screws are used and, when it is attached to a metal frame structure, screws or bolts are used. However, the adjustable bracket assembly of the present invention is not limited in any way by the type of structure to which it is attached nor by the type of hardware that is used to attach it to the structure.

The adjustable mounting bracket assembly includes a mounting bracket, an adapter plate and a fastener that secures the mounting bracket to the adapter plate. The mounting bracket has a length defined by two ends, a width defined by a pair of side walls and a substantially flat mounting plate having a rail and one or more openings for receiving electrical boxes. One end of the mounting bracket is attached to a first structure and the second end mates with the adapter plate. As used in the present invention, the terms "mate" and "mating" refer to the joining of the mounting bracket and the adapter plate by inserting or slidably inserting the adapter plate into the mounting bracket, as described in more detail below. It is also within the scope of the present invention for the dimensions of the components of the assembly to be changed so that the mounting bracket can be inserted into the adapter plate. In these embodiments, the side walls of the adapter plate have a pair of tabs instead of the side walls of the mounting bracket.

The rail is an elongated structure located, preferably, in the central portion of the mounting plate and it extends at least a part of the distance between the mating end and the electrical box opening closest to the mating end. The rail has an aperture that extends through the mounting plate. In a preferred embodiment, the rail is formed by a metal stamping operation that forms a depression in the mounting plate. The depression has side walls and, preferably, a substantially flat bottom. The aperture is in the bottom of the depression and it can be a round hole or a slot that extends substantially the entire length of the depression.

The adapter plate has a length defined by two ends, a width defined by a pair of side walls and a substantially flat base plate having a track. One end of the adapter plate is attached to a second structure and the second end mates with the mounting bracket. The track is an elongated structure that is located and dimensioned so that it slidably receives the rail when the mounting bracket and adapter plate are mated together. The track has an aperture located so that it corresponds to the aperture in the rail when the adapter plate and mounting bracket are joined together. After the adapter plate is slidably received by the mounting bracket, the two apertures are in alignment and the fastener passes through the two apertures and is tightened to secure the adapter plate to the mounting bracket. The fastener can include a screw and a nut or an internal screw thread can be formed in one of the apertures, preferably in the adapter plate aperture, using a tap so that only a screw is required. The fastener can include other variations that would be known to those skilled in the art, such as wing nuts, washers, split washers and bolts in place of screws.

The mounting plate can include a far-side support that is formed as part of the mounting plate and, when the adjustable bracket assembly is installed, the far-side support folds out from the mounting plate and contacts the structure behind the assembly. When the assembly is installed on a wall stud, the structure behind the assembly is typically the wall attached to the opposite side of the stud. The far-side support is substantially rectangular in shape with a first end and a second end and a pair of sides. The first end is permanently attached to the mounting plate and, when the far-side support is folded out from the mounting plate, it is pivotably bent along the first end. The second end of the far-side support contacts the wall behind the assembly. The second end and the two sides of the first section are either not attached to the mounting plate or only impermanently attached to the mounting plate, e.g., by thin strips of metal that are easily severable.

The far-side support has two sections in order to accommodate wall studs having different widths. The first section can be used for wall studs having a width of up to about 4 inches. For wall studs having widths greater than 4 inches, the far-side support has a second section or support extender, which is formed as part of the first section. The support extender has a first end, a second end and a pair of sides. The first end of the support extender is permanently attached to the first section of the far-side support and the second end and side walls are impermanently attached to the first section, e.g., by thin strips of metal, or not attached at all. The thin strips of metal that partially attach the second end and the two sides of the support extender can be easily severed with a utility knife or screw driver so that the support extender can be pivotably folded out of the first section along the first end. The support extender increases the length of the far-side support so that it can contact opposing walls attached to wall studs of up to about 6 inches.

The far-side support includes first and second sections and is preferably formed by a sheet metal stamping method that stamps two U-shaped apertures in the mounting plate, with the second U-shaped aperture within the bounds of the first U-shaped aperture. The two U-shaped apertures define the first and second sections of the far-side support. The first U-shaped aperture defines the far-side support with the open end of the "U" forming the first end, the base of the "U" forming the second end and the two legs forming the sides of the support. When the far-side support is folded out from the mounting plate, a first support aperture is formed in the plate. The second U-shaped aperture defines the second section of the far-side support and it is formed within the first U-shaped aperture, with the legs of both U-shaped apertures substantially parallel and the bases of the "U's" at opposite ends. When the second section is folded out from the far-side support, a second support aperture is formed in the first section.

The mounting bracket and the adapter plate of the adjustable bracket assembly are preferably made from metal, most preferably steel or aluminum. The components of the adjustable bracket assembly can be made using a metal stamping process or other fabrication methods well known to those skilled in the art of metal working. The most preferred method is a metal stamping process that stamps the rail and the track into the mounting plate and base plate, respectively, and forms the side walls of the mounting bracket and adapter plate. The adjustable bracket assembly can also be made from a thermoplastic material and formed using well known extrusion or molding processes.

The invention is now described in more detail with reference to the accompanying drawings. FIG. 1, which shows an exploded view of an adjustable mounting bracket assembly 10 that includes a mounting bracket 12, an adapter plate 50 and a screw 80 and nut 82 fastener. In some embodiments, the aperture 62 in the adapter plate 50 is tapped so that a nut 82 is not needed. The mounting bracket 12 has an attaching end 16, which is used to attach the mounting bracket 12 to a first structure (see FIG. 7A) and a mating end 14 that slidably receives the adapter plate 50. The mounting bracket 12 also includes a mounting plate 18 that has two openings 36, 38 for receiving an electrical box 96 (see FIG. 2) and a pair of side walls 24, 26, which extend downwardly from the mounting plate 18 to a pair of edges 28, 30 (see FIG. 3). FIG. 1 shows two openings 36, 38 for duplex electrical boxes. However, the present invention contemplates more than two openings 36, 38 and that the openings can be sized to receive electrical boxes having a variety of sizes so that the invention is not limited to an electric box having a specific size. The mounting plate 18 further includes a rail 20 which extends substantially the entire distance from the mating end 14 to the first electrical box opening 36. The rail 20 has an aperture 22 in its central portion for receiving a screw 80 which is used to fasten the mounting bracket 12 to the adapter plate 50. The mounting bracket 12 has one or more bracket mounting apertures 42 for attaching the bracket 12 to a structure 92 (see FIGS. 7A and 7B) and a plurality of electrical box mounting apertures 40 for securing the electrical boxes to the mounting plate 18.

Figures 7A, 7B:
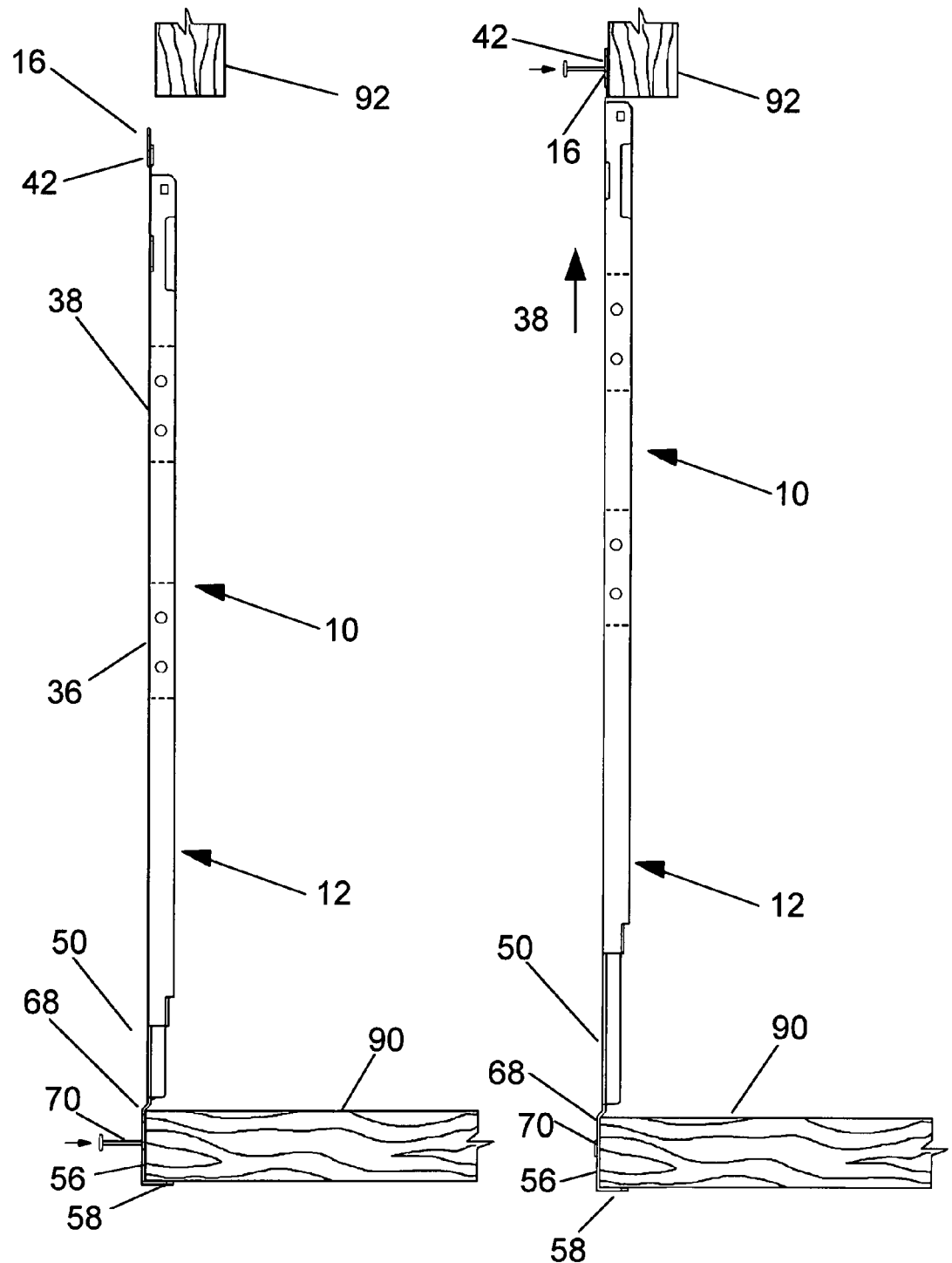
FIGS. 7A and 7B are side views of the adjustable mounting bracket assembly at it is attached in a vertical configuration.

The adapter plate 50 includes a base plate 52, a mating end 54 that is received by the mounting bracket 12 and an attaching end 56 for attaching the adapter plate 50 to a second structure 92 (see FIG. 7B). A track 60 in the central portion of the base plate 52 extends from the mating end 54 towards the attaching end 56. The track 60 has a substantially round aperture 62 for receiving the fastening screw 80 which first passes through the aperture 22 in the rail 20. After the screw 80 passes through the rail aperture 22 and the track aperture 62, it engages a nut 82, which can be tightened to fixedly secure the mounting bracket 12 to the adapter plate 50. The base plate 52 is offset from and connected to the attaching end 56 of the adapter plate 50 by a connecting wall 68 so that the surface of the base plate 52 is parallel to and below the surface of the attaching end 56. The attaching end 56 of the adapter plate 50 has an end wall 58 that extends downwardly from the attaching end 56. The attaching end 56 for the adapter plate 50 has one or more adapter plate mounting apertures 70 for attaching the adapter plate 50 to a structure 90 (see FIGS. 7A and 7B).

Figure 2:
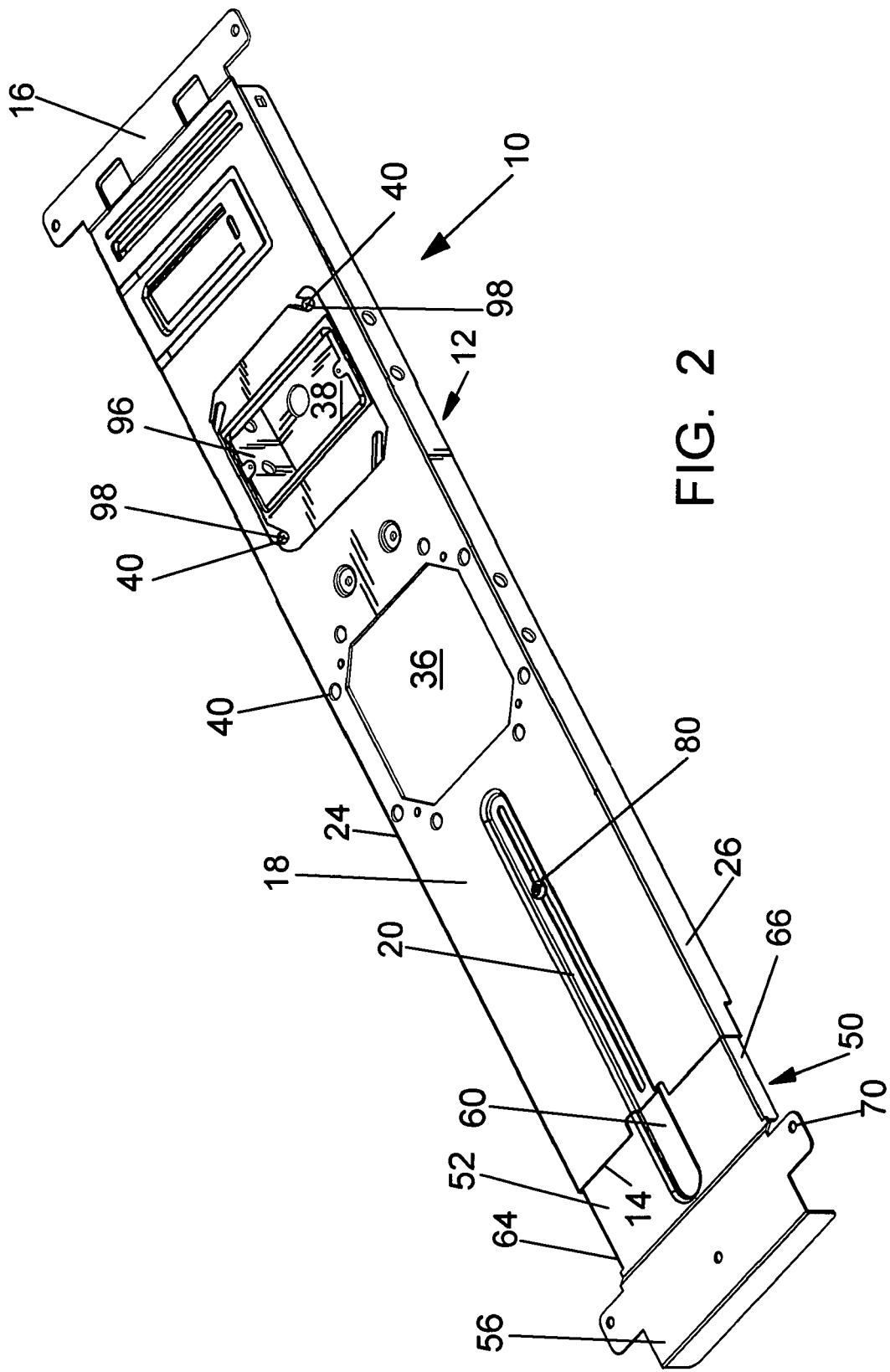
FIG. 2 is a top perspective view of the adjustable mounting bracket assembly with the mounting bracket connected to the adapter plate.

FIG. 2 is a top perspective view of the adjustable mounting bracket assembly 10 and it shows the mounting bracket 12 slidably receiving the adapter plate 50. The mounting bracket's opposing side walls 24, 26 (see FIG. 3) receive the adapter plate's opposing side walls 64, 66 and the adapter plate track 60 slidably receives the rail 20 on the mounting bracket 12. An electrical box 96 is shown in opening 38. Screws 98 are inserted in apertures 40 to secure the electrical box 96 to the mounting plate 18.

In the embodiment shown in FIG. 2, the rail 20 extends substantially the entire distance from the mating end 14 of the mounting bracket 12 to the first opening 36 for an electrical outlet box. The length of the rail 20 can vary and, as the length of the rail 20 increases, the adjustable distance between the opposing ends 16, 56 of the assembly 10 increases. The rail 20 shown in FIG. 2 has an aperture 22 in the form of a slot, which extends substantially the entire length of the rail 20, and is formed by a depression in the mounting plate 18. The dimensions of the rail 20 are selected so that when the screw 80 is inserted in the aperture 22, the head of the screw 80 is below the surface of the mounting plate 18 and can be rotated and moved freely in the slot 22 along the length of the rail 20.

Figure 3:
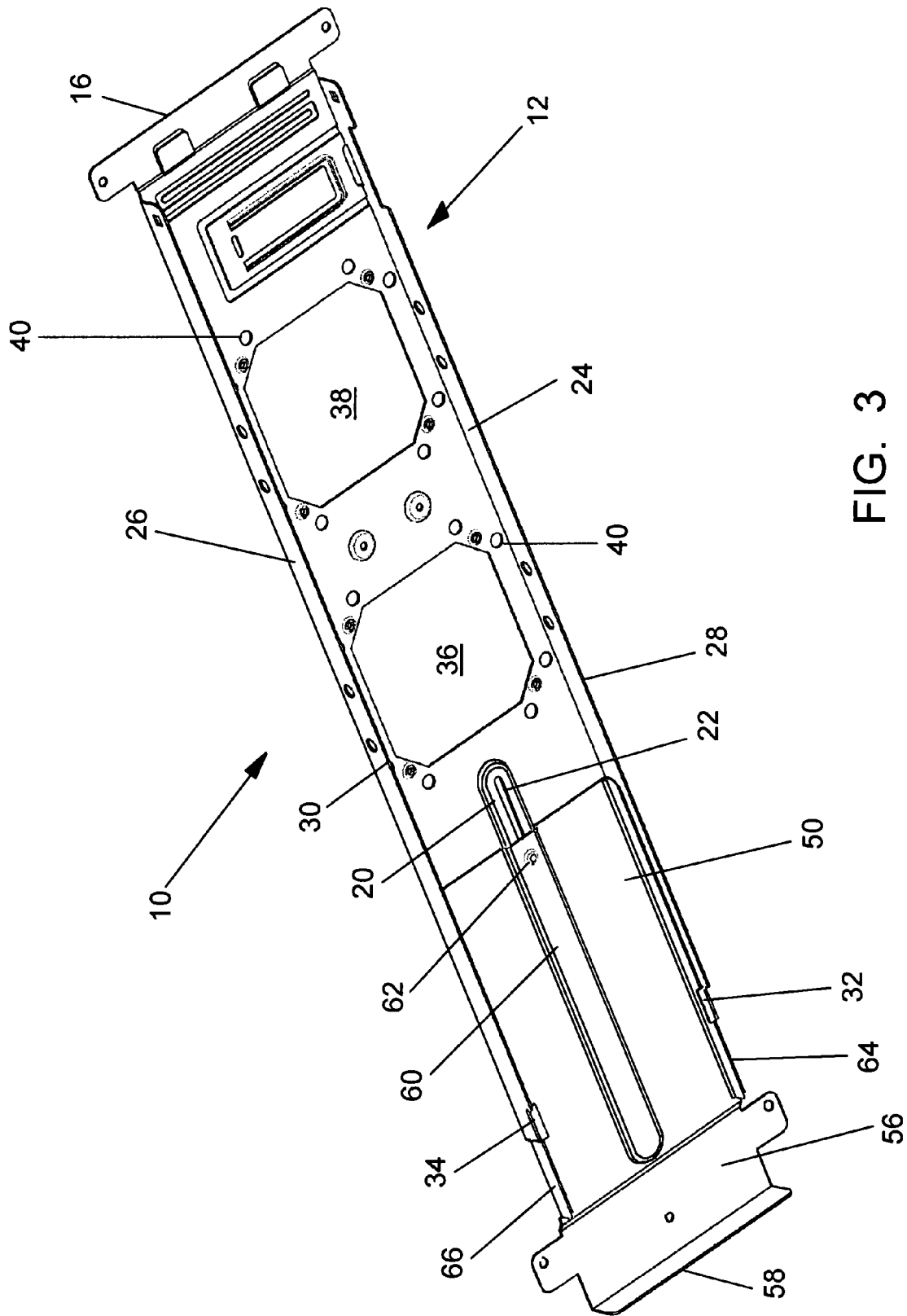
FIG. 3 is a bottom perspective view of the adjustable mounting bracket assembly with the mounting bracket connected to the adapter plate.

After the adjustable mounting bracket assembly 10 is mounted, and both the mounting bracket attaching end 16 and the adapter plate attaching end 56 are secured to two structures 90, 92 (see FIG. 7B), such as adjoining wall studs, the fastening screw 80 is inserted into the rail aperture 22 and the track aperture 62 (see FIG. 3). Tightening the fastening screw 80 and nut 82 secures the mounting bracket 12 to the adapter plate 50 in a fixed position. The adjustable mounting bracket assembly 10 can be mounted in a horizontal configuration, wherein the attaching ends 16, 56 are attached to adjacent wall studs, or it can be mounted in a vertical configuration, wherein the adapter plate attaching end 56 is attached to a sole plate (also referred to as a bottom plate) of a framed wall structure and the mounting bracket attaching end 16 is attached to a horizontal member.

FIG. 3 is a bottom perspective view of the adjustable mounting bracket assembly 10 with the mounting bracket 12 mated with the adapter plate 50. The opposing side walls 24, 26 of the mounting bracket 12 slidably receive the opposing side walls 64, 66 of the adapter plate 50 and the track 60 slidably receives the rail 20. The opposing side walls 24, 26 of the mounting bracket 12 extend substantially perpendicularly from the mounting plate 18 to form a pair of edges 28, 30. A pair of tabs 32, 34 extend inwardly from the edges 28, 30. The tabs 32, 34 shown in FIG. 3 are located near the mating end 14 (see FIG. 1) of the mounting plate 18 and extend for only a short distance along the edges 28, 30. However, it is within the scope of the present invention for the tabs 32, 34 to extend either the entire length of the edges 28, 30 or up to the opening 36 for the electrical box. It is also within the scope of the invention for more than one pair of tabs to be included. The tabs 32, 34 together with the opposing side walls 24, 26 and the mounting plate 18 form a C-shaped opening that slidably receives the opposing side walls 64, 66 of the adapter plate 50.

Figure 4:
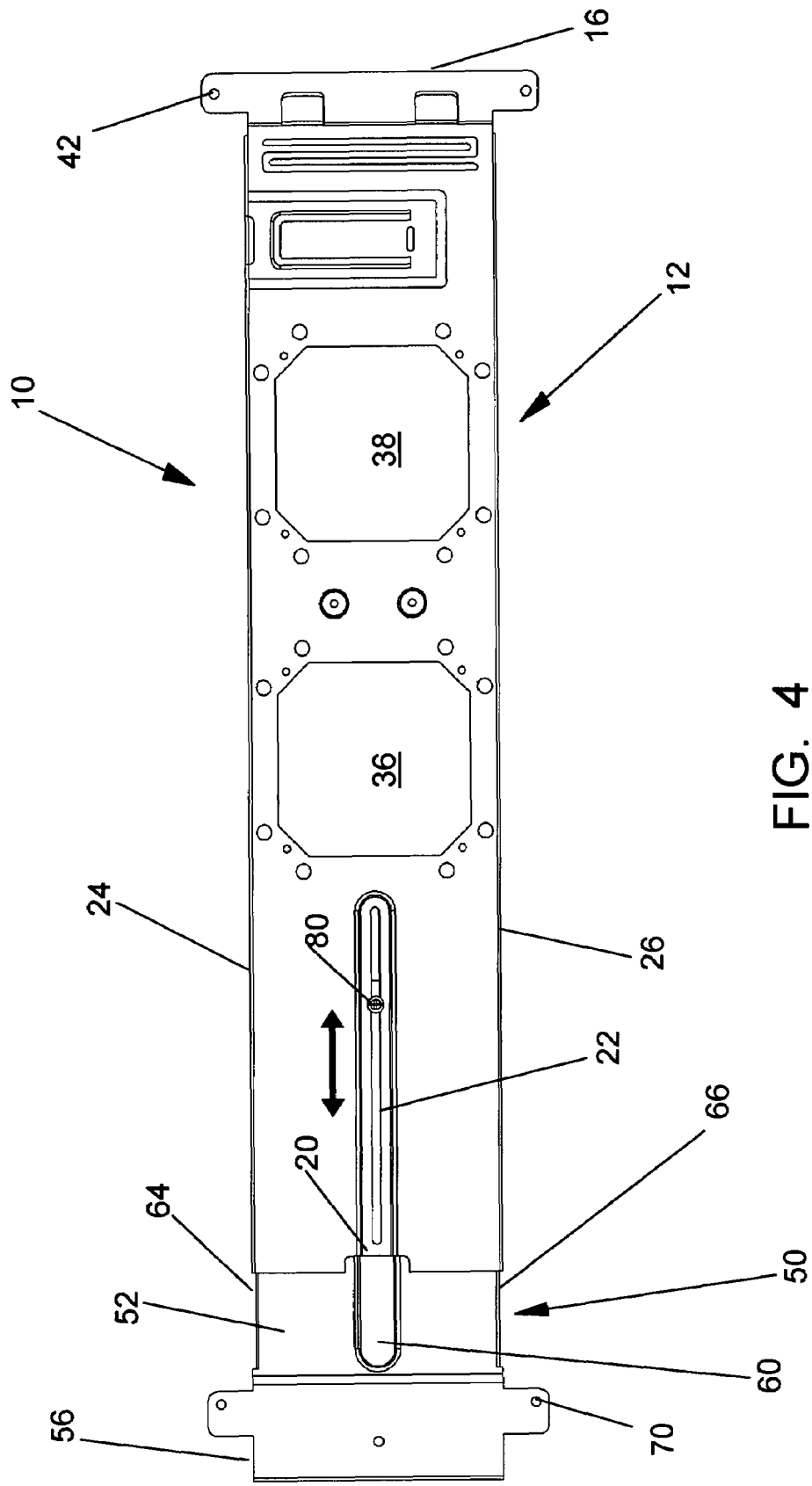
FIG. 4 is a top view of the adjustable mounting bracket assembly with the mounting bracket connected to the adapter plate.

FIG. 4 is a top view of the adjustable mounting bracket assembly 10 with the adapter plate 50 slidably inserted in the mounting bracket 12 and fastening screw 80 tightened to secure the adapter plate 50 to the mounting bracket 12. After the adapter plate attaching end 56 and the mounting bracket attaching end 16 are attached to two structures, electrical boxes can be mounted in either, or both, of the two openings 36, 38. When the adjustable mounting bracket assembly 10 is used in an application that requires a vertical orientation, the adapter plate attaching end 56 is attached to a sole plate and the mounting bracket 12 is adjusted so that the electrical box openings 36, 38 are at the desired elevation. The fastening screw 80 is then tightened to lock the mounting bracket 18 at the desired elevation and the mounting bracket attaching end 16 is attached to a stud. In another application, a horizontal member is installed between two adjoining wall studs and the mounting bracket attaching end 16 is attached to the horizontal member to complete the installation of the adjustable mounting bracket assembly 10.

Figure 5:
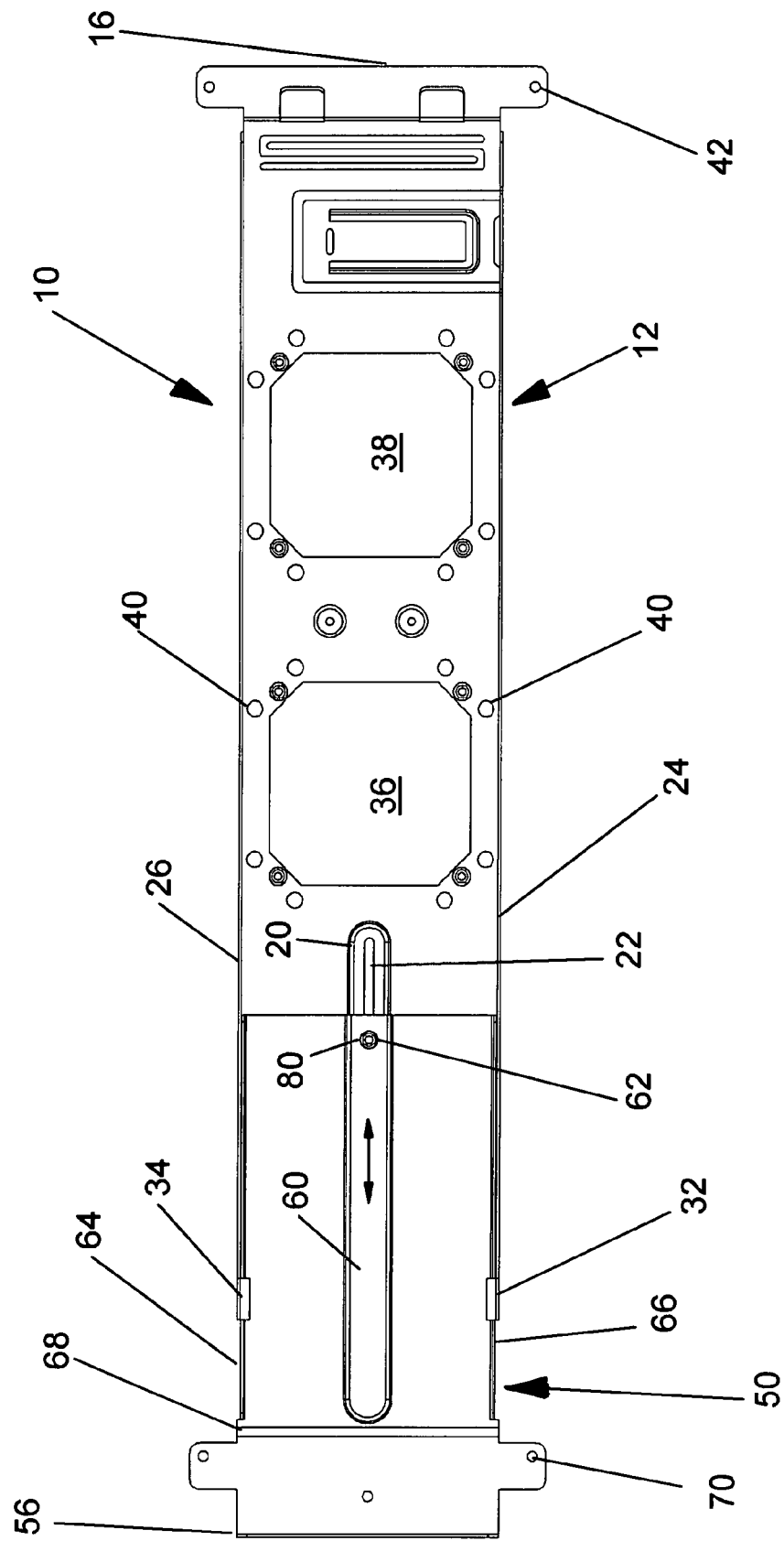
FIG. 5 is a bottom view of the adjustable mounting bracket assembly with the mounting bracket connected to the adapter plate.

FIG. 5 shows the mounting bracket assembly 10 of the present invention with the mounting bracket 12 slidably receiving the adapter plate 50. The aperture 62 for the track 60 is aligned with the slot 22 in the rail 20. In the embodiment illustrated in FIG. 5, the aperture 62 in the track 60 is tapped to provide threads for receiving the fastening screw 80. When the screw 80 is inserted in the slot 22 in the rail 20 (see FIG. 4) and the aperture 62 in the track 60, but before the screw 80 is tightened, the distance between the opposing attaching ends 16, 56 of the mounting bracket assembly 10 can be adjusted by slidably moving the adapter plate 50 between the opening formed by the tabs 32, 34 and side walls 24, 26 of the mounting bracket 12. After the adjustable mounting bracket assembly 10 has been adjusted to the desired position, the fastening screw 80 is tightened to secure the mounting bracket 12 and the adapter plate 50 in a fixed position.

Figure 6:
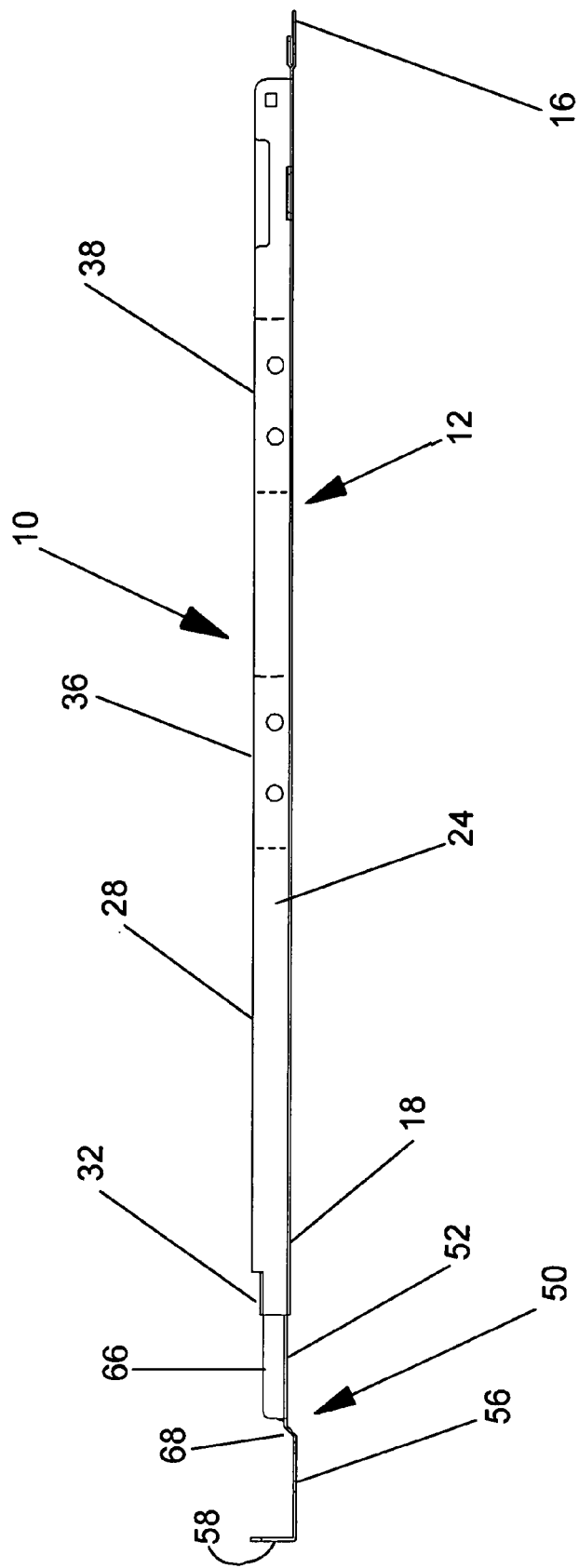
FIG. 6 is a side view of the adjustable mounting bracket assembly with the mounting bracket connected to the adapter plate.

FIG. 6 is a side view of the adjustable mounting bracket assembly 10 which shows the mounting bracket 12 slidably receiving the adapter plate 50. The side wall 24 of the mounting bracket 12 extends beyond the side wall 66 of the adapter plate 50 and the tab 32 extends over the top of the adapter plate side wall 66. The adapter plate 50 includes a connecting wall 68 which connects and offsets the attaching end 56 and the base plate 52. The offset provided by the connecting wall 68 aligns the adapter plate attaching end 56 and the mounting bracket attaching end 16 so that their surfaces are in substantially the same plane. Thus, when the adjustable mounting bracket assembly 10 is attached to two adjoining wall studs, the mounting bracket assembly 10 will be substantially parallel to the surface of the wall.

FIGS. 7A and 7B illustrate how the adjustable mounting bracket assembly 10 can be adjusted for mounting in a vertical configuration between a sole plate 90 and a stud 92. FIG. 7A shows the mounting bracket assembly 10 with the adapter plate attaching end 56 secured to the sole plate 90 of a framed wall and the adapter plate end wall 58 positioned under the sole plate 90. The opposing mounting bracket attaching end 16 is extended (FIG. 7B) until the openings 36, 38 for the electrical boxes are at the desired elevation. FIG. 7B shows how the adjustable mounting bracket assembly 10 is extended and the mounting bracket attaching end 16 is secured to a stud 92.

Figure 8A:
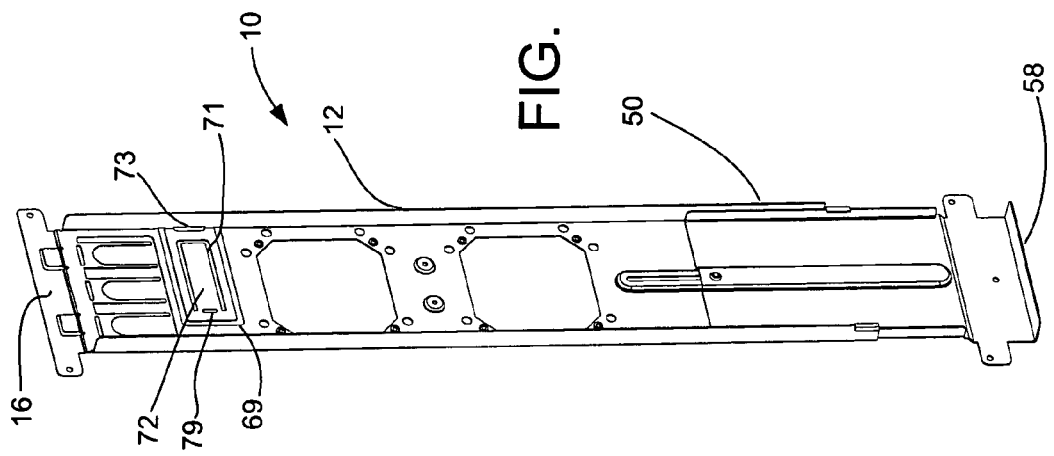
FIGS. 8A and 8B are perspective front and back views of an embodiment of the adjustable mounting bracket assembly with the far-side support unextended.
Figure 8B:
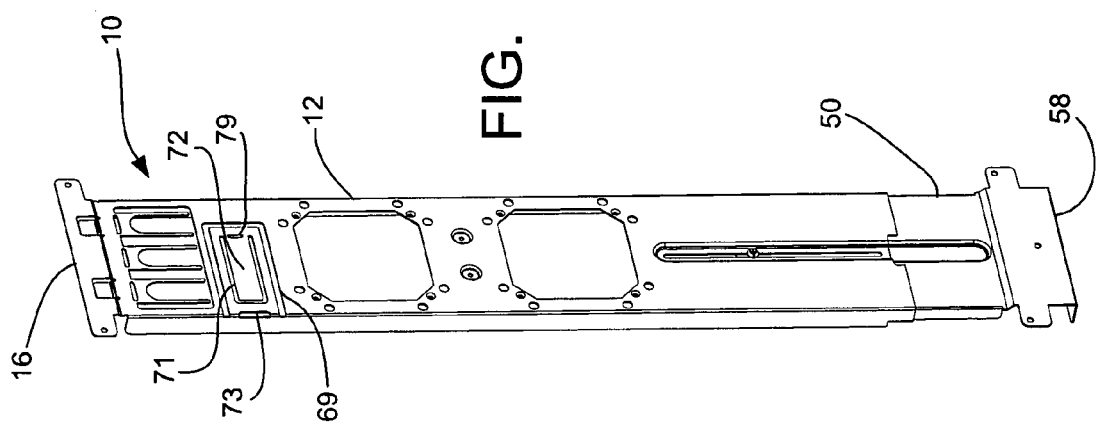

FIGS. 8A and 8B show an embodiment of the adjustable mounting bracket assembly 10 with the unextended far-side support 72 in the mounting bracket 12 section of the bracket assembly 10. The figures show the two U-shaped apertures 69, 71 in the mounting bracket 12, which are used to form the far-side support 72. The first U-shaped aperture 69 has the open end of the "U" permanently attached to the mounting bracket 12 and the two legs and base of the U-shaped aperture 69 extend into the mounting bracket 12 to form the far-side support 72. The first end of the far-side support 72 is permanently attached to the mounting bracket 12 and can have a support bending aperture 73, which facilitates bending the far-side support 72 along the open end of the U-shaped aperture 69. The second U-shaped aperture 71 is formed in the far-side support 72, within the first U-shaped aperture 69, with the legs of the two U-shaped apertures 69, 71 substantially parallel. The open end of the "U" for the second U-shaped aperture 71 is permanently attached to the far-side support 72 near its second end. The two legs and base of the second U-shaped aperture 71 extend into the far-side support 72 to form the support extender 78. The open end of the second U-shaped aperture 71 can have an extender bending aperture 79, which facilitates bending the support extender 78 (see FIG. 10A) along the open end of the U-shaped aperture 71.

FIGS. 9A and 9B show an embodiment of the adjustable mounting bracket assembly 10 with the far-side support 72 extended and forming a far-side support aperture 74 in the mounting bracket 12. When the far-side support 72 is extended, it can contact a structure behind the bracket assembly 10 and provide support for the assembly 10. The far-side support 72 is bent at the open end of the U-shaped aperture 69 (see FIG. 9A) near the support bending aperture 73. The figures show the far-side support 72 bent about 90 degrees from the surface of the mounting bracket 12. However, the far-side support 72 can be bent at any angle between 0 and 90 degrees (or in some cases even more than 90 degrees), depending on the distance between the mounting bracket 12 and the structure behind it.

Figure 10A:
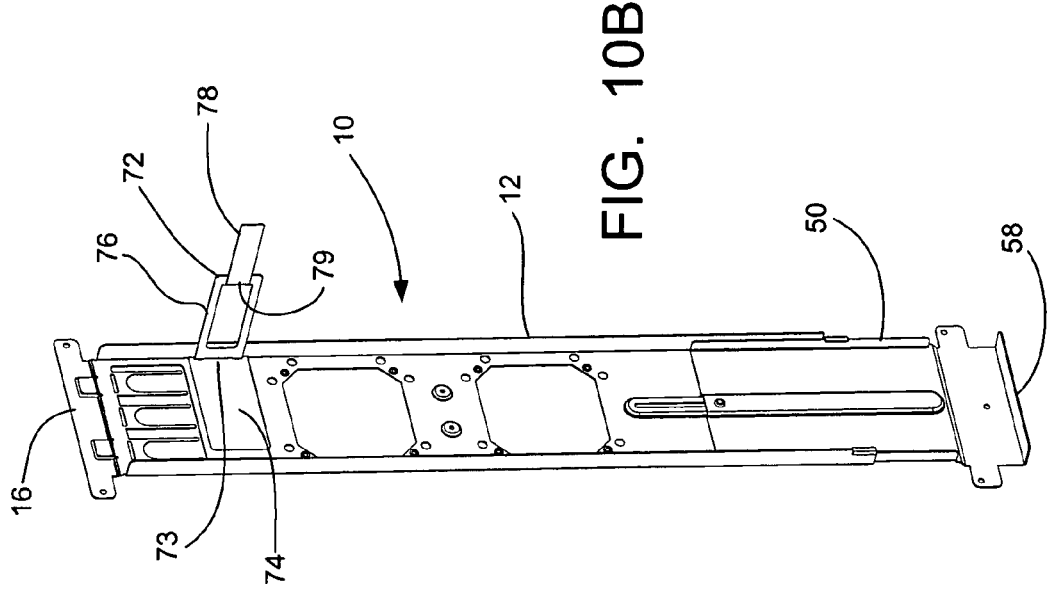
FIGS. 10A and 10B are perspective front and back views of an embodiment of the adjustable mounting bracket assembly with the first and second sections of the far-side support extended.
Figure 10B:
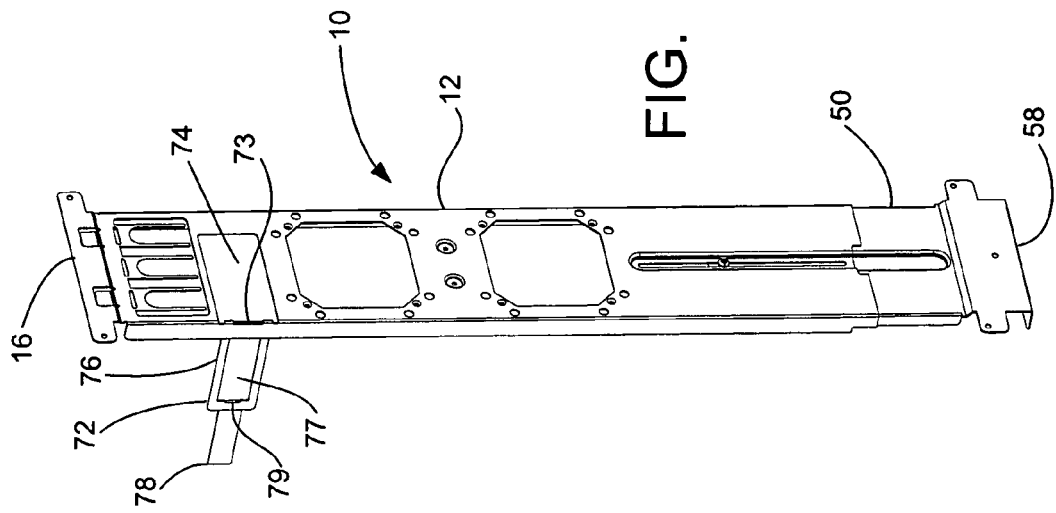

FIGS. 10A and 10B show an embodiment of the adjustable mounting bracket assembly 10 with the far-side support 72 extended from the mounting bracket 12. This figure shows the two sections 76, 78 of the far-side support 72. The first section 76 is the main part of the far-side support and the second section (or support extender) 78 is bent out of and away from the first section 76. Extending the second section 78 from the first section 76 forms an extender support aperture 77 in the first section 76. The second section 78 can be bent up to about 180 degrees from the surface of the first section 76 so that the first section 76 and the second section 78 are substantially in the same plane. This provides the maximum extension length for the far-side support 72. Typically, the first section 76 and the second section 78 of the far-side support 72 are extended as far as necessary to contact the structure behind the mounting bracket 12. The second section 78 of the far-side support 72 is preferably bent at the extender bending aperture 79.

Thus, while there have been described the preferred embodiments of the present invention, those skilled in the art will realize that other embodiments can be made without departing from the spirit of the invention, and it is intended to include all such further modifications and changes as come within the true scope of the claims set forth herein. Hence, for example, while the foldable/extendable far-side support has been described above with respect to an adjustable mounting bracket, it is equally suitable for use with a fixed mounting bracket. There is no intent to limit the use of the far-side support to a particular type of electrical box mounting bracket or to any of the structures, devices or functions described and/or illustrated herein.

I claim:

1. A mounting bracket assembly for mounting an electrical box comprising:
   a substantially flat mounting plate having a pair of opposing sides, an opening for receiving an electrical box and a far-side support having a first end, a second end and a pair of sides and comprising a first section and a second section;
   wherein the far-side support foldably extends from the mounting plate and the second section foldably extends from the first section, and wherein the second section forms a support aperture in the first section when it is foldably extended.

2. The mounting bracket assembly according to claim 1, wherein the first section forms a support aperture in the mounting plate when it is foldably extended.

3. The mounting bracket assembly according to claim 1, wherein the first end of the far-side support is connected to the mounting plate, and wherein the far-side support further comprises a support bending aperture at the first end.

4. The mounting bracket assembly according to claim 1, wherein the second section comprises a first end, a second end and a pair of sides, and wherein the first end of the second section has an extender bending aperture and connects to the second end of the first section.

5. The mounting bracket assembly according to claim 4, wherein the pair of sides of the first section are substantially parallel to the pair of sides of the second section.

6. A mounting bracket assembly for mounting an electrical box comprising:
   a mounting plate having a pair of opposing sides, an opening for receiving an electrical box and a far-side support comprising:
   a first end;
   a second end;
   a pair of sides; and
   a support extender,
   wherein the first end is permanently connected to the mounting plate and the second end foldably extends from the mounting plate and wherein the support extender is pivotably bent to form a support extender aperture in the far-side support.

7. The mounting bracket assembly according to claim 6, wherein the far-side support is substantially flat and substantially rectangular.

8. The mounting bracket assembly according to claim 6, wherein the far-side support is pivotably bent at the first end to form a support aperture in the mounting plate.

9. The mounting bracket assembly according to claim 8, wherein the first end of the far-side support comprises a support bending aperture.

10. The mounting bracket assembly according to claim 6, wherein the support extender has a first end, a second end and a pair of sides, and wherein the first end is permanently connected to the far-side support and the second end foldably extends from the far-side support.

11. The mounting bracket assembly according to claim 6, wherein the support extender is substantially flat and substantially rectangular.

12. The mounting bracket assembly according to claim 6, wherein the first end of the support extender comprises an extender bending aperture.

13. A mounting bracket assembly for mounting an electrical box comprising:
   a substantially flat mounting plate having a pair of opposing sides, an opening for receiving an electrical box and a far-side support; and
   a mounting bracket attaching end;
   wherein the far-side support comprises a first section and a second section, wherein the second section is part of the first section, wherein the first section of the far-side support is bendably connected to the mounting plate and the second section is bendably connected to the first section and wherein the second section bendably extends from the first section to form a support aperture in the first section.

14. The mounting bracket assembly according to claim 13, wherein the first section of the far-side support has a first end, wherein the first end of the first section is connected to the mounting plate, and wherein the first end of the first section comprises a support bending aperture.

15. The mounting bracket assembly according to claim 14, wherein the second section of the far-side support has a first end, wherein the first end of the second section is connected to the second end of the first section, and wherein the first end of the second section comprises a support bending aperture.

16. The mounting bracket assembly according to claim 13, wherein the first section bendably extends from the mounting plate to form a support aperture in the mounting plate.

* * * * *